United States Patent
Kuki et al.

(10) Patent No.: US 7,008,461 B2
(45) Date of Patent: Mar. 7, 2006

(54) HONEYCOMB STRUCTURE, METHOD FOR MANUFACTURING HONEYCOMB STRUCTURE, AND EXHAUST GAS PURIFICATION SYSTEM USING HONEYCOMB STRUCTURE

(75) Inventors: Tatsuyuki Kuki, Kasugai (JP); Toshio Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 245 days.

(21) Appl. No.: 10/668,195

(22) Filed: Sep. 24, 2003

(65) Prior Publication Data

US 2004/0068971 A1    Apr. 15, 2004

(30) Foreign Application Priority Data

Oct. 10, 2002    (JP)    ............................... 2002-297708

(51) Int. Cl.
*B01D 46/00*    (2006.01)
*B32B 3/12*    (2006.01)

(52) U.S. Cl. ................... 55/282.3; 55/282.2; 55/385.3; 55/523; 55/524; 55/DIG. 5; 55/DIG. 10; 55/DIG. 30; 60/297; 60/311; 428/116; 428/117; 264/628; 264/630; 264/631; 264/154; 264/156; 264/DIG. 48

(58) Field of Classification Search ............... 55/282.2, 55/282.3, 523, 524, 385.3, DIG. 5, DIG. 10, 55/DIG. 30; 60/297, 299, 303, 311; 428/116, 428/117, 118; 264/628, 629, 630, 631, 154, 264/155, 156, DIG. 48
See application file for complete search history.

(56) References Cited

U.S. PATENT DOCUMENTS

| | | | |
|---|---|---|---|
| 4,329,162 A * | 5/1982 | Pitcher, Jr. ................... 55/523 |
| 4,404,007 A * | 9/1983 | Tukao et al. ................... 55/523 |
| 4,464,185 A | 8/1984 | Tomita et al. |
| 4,509,966 A * | 4/1985 | Dimick et al. ................. 55/523 |
| 4,557,773 A | 12/1985 | Bonzo |
| 4,559,193 A * | 12/1985 | Ogawa et al. ............... 264/631 |
| 5,458,673 A * | 10/1995 | Kojima et al. ............. 55/385.3 |
| 5,766,393 A * | 6/1998 | Nishimura et al. ......... 264/630 |
| 6,447,564 B1 * | 9/2002 | Ohno et al. .................... 55/523 |
| 6,726,977 B1 * | 4/2004 | Kumazawa et al. ........... 55/523 |
| 6,790,248 B1 * | 9/2004 | Ishihara et al. ........ 55/DIG. 30 |
| 6,800,107 B1 * | 10/2004 | Ishihara et al. ............... 55/523 |
| 6,811,737 B1 * | 11/2004 | Fukuta et al. ............... 264/629 |
| 6,840,976 B1 * | 1/2005 | Vance et al. ................... 55/523 |
| 6,898,930 B1 * | 5/2005 | Nakatani et al. .............. 60/311 |

FOREIGN PATENT DOCUMENTS

| EP | 1 219 794 A1 | 7/2002 |
|---|---|---|
| JP | 58-72414 | * 5/1983 |

(Continued)

*Primary Examiner*—Jason M. Greene
(74) *Attorney, Agent, or Firm*—Oliff & Berridge, PLC (57) ABSTRACT

There is disclosed a honeycomb structure usable as a filter for trapping/collecting particulates included in an exhaust gas; and the structure can remove ashes deposited inside without requiring any special mechanism or apparatus or without being detached from the exhaust system. The structure includes: a plurality of through channels 9 extending to the axial direction of the honeycomb structure, porous partition walls 7 separating through channels one another, and plugging portions 11 plugging predetermined through channels 9a at one end and the rest of through channels 9b at other end opposite to the plugged end of the predetermined through channels, wherein a through-hole is formed in at least a part of the plugging portion, and its diameter is 0.2 mm or more, but not more than a value which is smaller between 1 mm and 75% of a diameter of an inscribed circle of the through channel.

22 Claims, 7 Drawing Sheets

FOREIGN PATENT DOCUMENTS

| | | |
|---|---|---|
| JP | 58-72414 U | 5/1983 |
| JP | A 08-28247 | 1/1996 |
| JP | A 2001-50028 | 2/2001 |
| JP | A 2002-119867 | 4/2002 |

* cited by examiner

HONEYCOMB STRUCTURE, METHOD FOR MANUFACTURING HONEYCOMB STRUCTURE, AND EXHAUST GAS PURIFICATION SYSTEM USING HONEYCOMB STRUCTURE

BACKGROUND OF THE INVENTION

1. Field of the Invention

The present invention relates to a honeycomb structure for use in a filter for trapping/collecting particulates in an exhaust gas of an internal combustion engine, boiler, and the like, a method for manufacturing the honeycomb structure, and an exhaust gas purification system using the honeycomb structure.

2. Description of the Related Art

An exhaust gas exhausted from internal combustion engines such as a diesel engine contains a large amount of particulates (particulate materials) containing carbon which causes pollution as a major component. Therefore, a filter for trapping/collecting the particulates is sometimes mounted in an exhaust system.

Figure 6A:
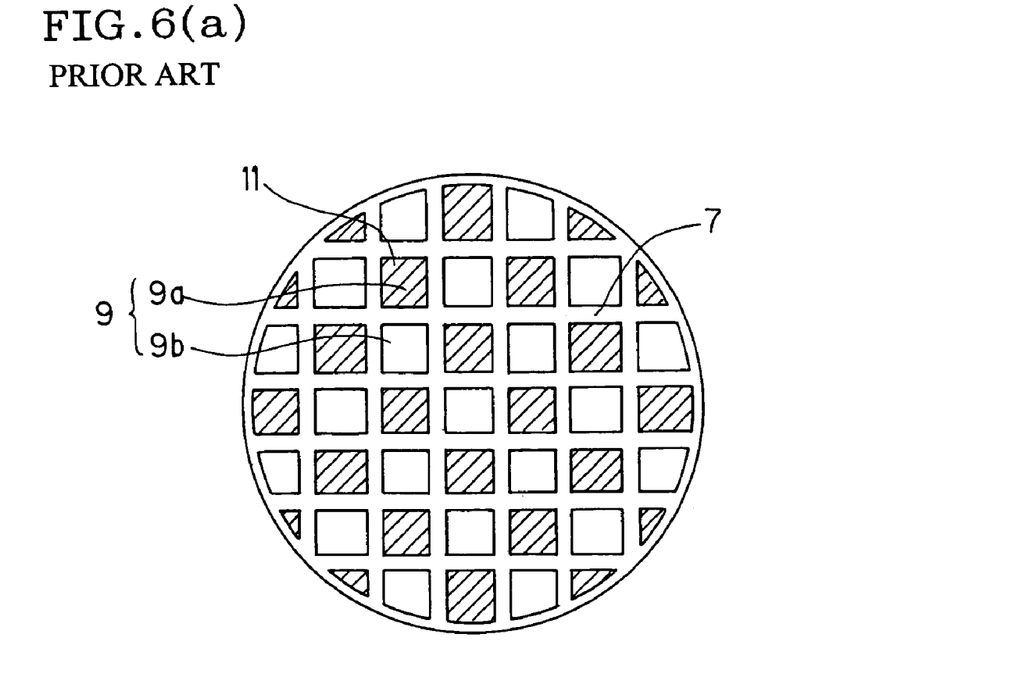
Figure 6B:
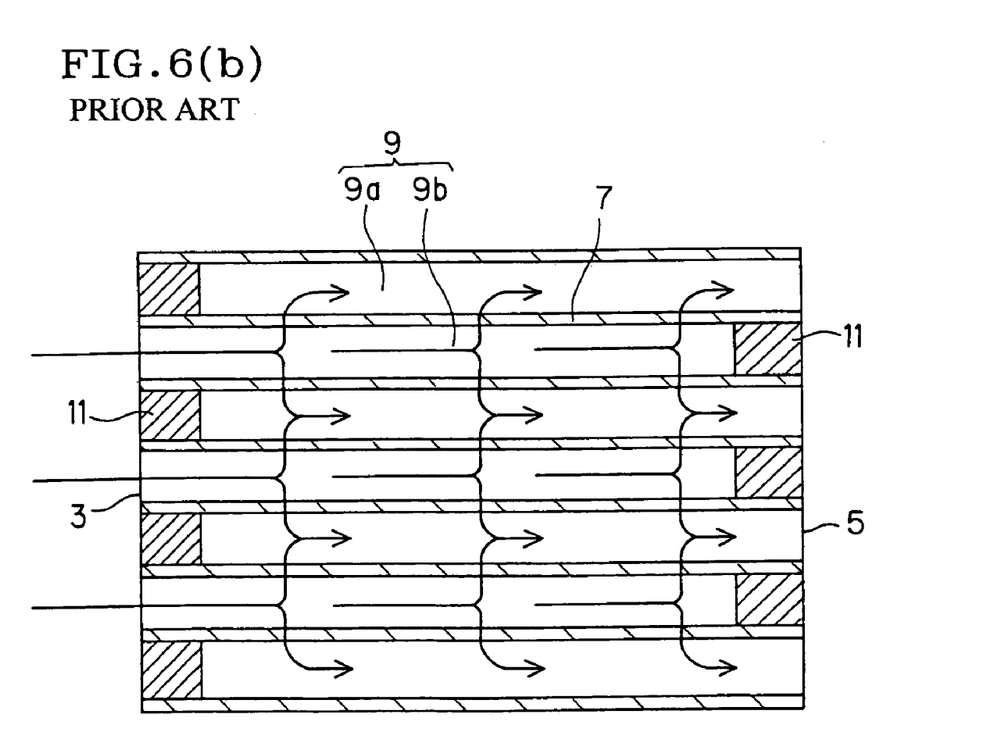

In general, as a filter to be used for this purpose, as shown in FIGS. 6(a) and (b), one usually uses a honeycomb structure including: a plurality of through channels 9, porous partition walls 7 separating the through channels one another; said through channels extending through an axial direction of the honeycomb structure; and the plugging portions 11 plugging the predetermined through channels 9a at one end face, and the rest of the through channels 9b at other end face opposite to the plugged end of predetermined through channels 9a.

The exhaust gas flows in the filter made of such a honeycomb structure mentioned above via one end face 3 thereof, and the gas flows out of the other end face 5 after the particulates included in the gas are removed. Concretely, the exhaust gas first flows into the through channels 9b whose ends are not plugged at the end face 3 on an inflow side and whose other ends are plugged face 5 on an outflow side, moves into the through channels 9a whose ends are plugged at the end face 3 on an inflow side and whose ends are not plugged at the end face 5 on an outflow side, via the porous partition walls 7, and flows out via the through channels 9a. Moreover, in this case, the partition walls 7 function as filter layers, and the particulates in the exhaust gas are trapped by the partition walls 7 and deposited on the partition walls 7.

After the use of the filter for a given period of time, the particulates deposited in the filter are burnt with heating the filter by electric conduction of an electric heater to be removed, but are not completely removed, and some of the particulates remain as ashes (ash components) in the filter. Therefore, with the use of the filter over a long period of time, a filter capacity substantially decreases by the deposition of the ashes, pressure loss increases, and an amount of particulates that can be trapped/collected decreases. There has therefore been a problem that the frequency for the regeneration treatment of the filter by burning/removing the captured particulates as described above have to be increased.

To solve the problem, for example, there has been proposed an apparatus in which the filter is supported in a direction vertical to the direction of the gas flow, and said apparatus having a vibration device provided to the filter, and an ash collecting portion provided at lower portion of the filter for collecting ashes dropping off the filter by virtue of vibration applied to the filter by the vibration device (see JP-A-8-28247).

Moreover, there has been proposed a method in which a highly pressurized fluid such as water is sprayed onto one end of the filter to clean/remove the residue after burning resided in the filter (see JP-A-2001-50028).

Furthermore, in the same manner as in the present application, there has been proposed a method for forming a through-hole in the plugging portion at the end of the through channel to discharge the ashes (see Japanese Utility Model Application Laid-Open No. 58-72414).

However, any one of these techniques proposed has not been very practical. For example, the device proposed in the above-mentioned Laid-open Japanese Utility Model Application can not be used practically since a trapping/collecting efficiency of particulates during the use is low because the through-hole formed in the plugging portion is not closed by the trapped particulates. Moreover, a special mechanism or apparatus is required to remove the ashes from the filter, in some case, or the filter needs to be detached from the exhaust system in other case to remove the ashes from the filter. Therefore, the conventional techniques or methods have not been practical.

SUMMARY OF THE INVENTION

The present invention has been developed in consideration of the conventional situations, and an object thereof is to provide a honeycomb structure which can be used in a filter for trapping/collecting particulates included in an exhaust gas and which can remove ashes deposited inside without requiring any special mechanism or apparatus or without being detached from an exhaust system.

According to the present invention, there is provided a honeycomb structure comprising: a plurality of through channels extending through an axial direction of the honeycomb structure, porous partition walls separating through channels one other, and plugging portions for plugging predetermined through channels at one end and the rest of through channels at other end opposite to the plugged end of the predetermined through channels, wherein a through-hole is formed in at least a part of the plugging portion, and a diameter of the through-hole is 0.2 mm or more, but not more than a value which is smaller between 1 mm and 75% of a diameter of an inscribed circle of the through channel (first aspect of the invention).

Moreover, according to the present invention, there is provided a method for manufacturing the honeycomb structure according to the first aspect of the invention; which comprises the step of injecting ceramic paste for forming the plugging portion at the end of the through channel, and subjecting either the ceramic paste thus injected or a plugging portion formed from the ceramic paste thus injected to a processing to form a through-hole in the plugging portion (second aspect of the invention). In this case, it is preferable to form the through-hole having a diameter of 0.2 mm or more, but not more than a value which is smaller between 1 mm and 75% of a diameter of an inscribed circle of the through channel.

One may employ any method to form a through-hole in the plugged portion as far as the through-hole can be made in an intended shape. One may preferably use any one of the methods forming a through-hole mentioned below. For example, one may spray a fluid onto a part of the ceramic paste thus injected to form a through-hole in the plugged portion so as to form a through-hole having a diameter of 0.2 mm or more, but not more than a value which is smaller between 1 mm and 75% of a diameter of an inscribed circle of the through channel in the plugged portion.

Furthermore, one may use a rod-shaped thermoplastic organic material or a rod-shaped combustible material to form a through-hole in the plugged portion. In this case, the through-hole is formed by inserting a rod-shaped thermoplastic organic material or a rod-shaped combustible material in the ceramic paste, and, subsequently heating the resultant honeycomb structure to allow the rod-shaped thermoplastic organic material to melt/flow out, or to allow the rod-shaped combustible material to burn/remove, so that a through-hole is formed in the plugging portion (other embodiment of second aspect of the invention).

The insertion of the rod-shaped thermoplastic organic material or the rod-shaped combustible material may be done simultaneously at the time of injecting the ceramic paste into the through channel or after the completion of the injection of the ceramic paste into the through channels.

One may form a through-hole in the plugging portion after injecting ceramic paste forming the plugging portion in the end of the through channel using a drill jig including a plurality of protrusions attached to a plate-like base. In this case, the jig is pressed onto the ceramic paste injected to form a through-hole in the plugged portion (another embodiment of the second aspect of the invention).

Indeed, one may use a laser beam irradiation to form a through-hole in the plugged portion. In this case, the irradiation of laser can be carried out by applying a laser to the ceramic paste just after injection thereof or forming the plugged portion from the ceramic paste injected. In case of the former one, a part of the ceramic paste injected is irradiated with laser to form a through-hole in the plugging portion (still another embodiment of the second aspect of the invention). In the latter case, the plugging portion is formed according to the conventional method before the irradiation of laser. Subsequently, the plugging portion formed is irradiated with laser to form the through-hole in the plugging portion.

Moreover, according to the present invention, there is provided a method for manufacturing the honeycomb structure according to the first aspect of the invention. In the step of forming the plugging portion in the end of the through channel, a melting point lowering component for lowering a melting point of cordierite is mixed into solvent to prepare a mixed solution, and the mixed solution is attached to the end of the honeycomb structure of cordierite. Subsequently, the structure is calcined to increase a thickness of a portion to which the mixed solution has been attached, so that the plugging portion including a through-hole is formed (third aspect of the invention).

Moreover, according to the present invention, there is provided an exhaust gas purification system for trapping/collecting/removing particulate materials containing carbon as a major component included in dust-containing fluids such as an exhaust gas of an internal combustion engine, the system comprising: the honeycomb structure according to the first aspect of the invention which is used as a filter for trapping/collecting the particulate materials; and heating means for burning the particulate materials trapped/collected by the honeycomb structure to regenerate a filtering capacity. A through-hole of a plugging portion of the honeycomb structure has such a structure that the through-hole is substantially closed by the accumulated particulate materials trapped/collected during the run, that the thus closed through-hole substantially opens by burning the particulate materials with heating the filter at the time of the regeneration, and that at least some of unburnt materials such as ashes deposited in the honeycomb structure are discharged from the honeycomb structure via the reopened through-hole with flow of the dust-containing fluids, when the through-hole is reopened as a result of the regeneration (fourth aspect of the invention).

BRIEF DESCRIPTION OF THE DRAWINGS

FIG. 1(*a*) and FIG. 1(*b*) show a schematic explanatory view showing one example of an embodiment of a honeycomb structure according to a first aspect of the invention, FIG. 1(*a*) is a plan view seen from one end face side, and FIG. 1(*b*) is a sectional view;

FIG. 5(*a*), FIG. 5(*b*) and FIG. 5(*c*) show sectional views showing shapes of the through-hole, FIG. 5(*a*) shows a tapered shape, FIG. 5(*b*) shows a tapered shape which has inclination reverse that of the shape shown in FIG. 5(*a*), and FIG. 5(*c*) shows a contracted shape;

FIG. 6(*a*) and FIG. 6(*b*) show schematic explanatory views showing a basic structure of the honeycomb structure for use as a conventional filter, FIG. 6(*a*) is a plan view seen from one end face side, and FIG. 6(*b*) is a sectional view;

The following numerical references in the accompanying drawings denote the portion and/or the member as specified below, respectively:

3 . . . end face from which the exhaust gas flows in, 5 . . . end face from which the exhaust gas flows out, 7 . . . partition wall, 9 . . . through channel, 9*a* . . . through channel, 9*b* . . . through channel, 11 . . . plugging portion, 13 . . . through-hole, 21 . . . particulates.

DESCRIPTION OF THE PREFERRED EMBODIMENT

Figure 1A:
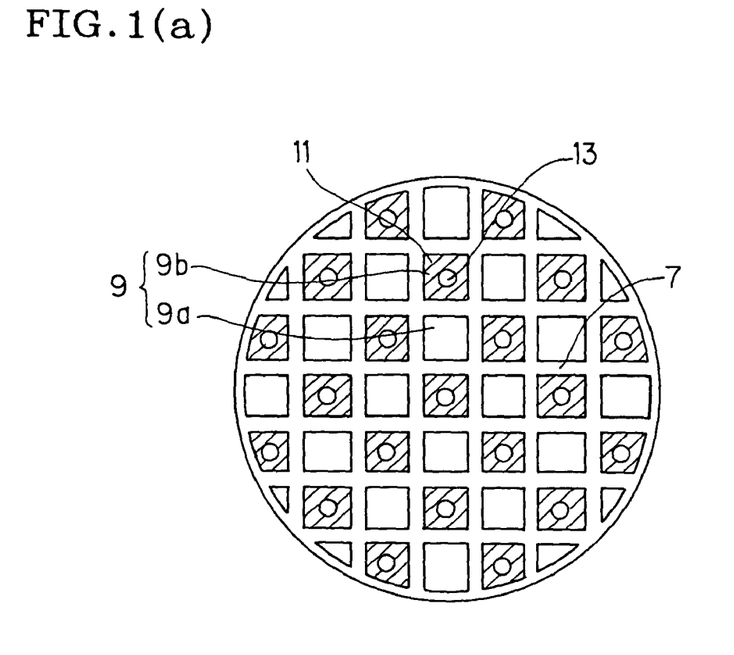
Figure 1B:
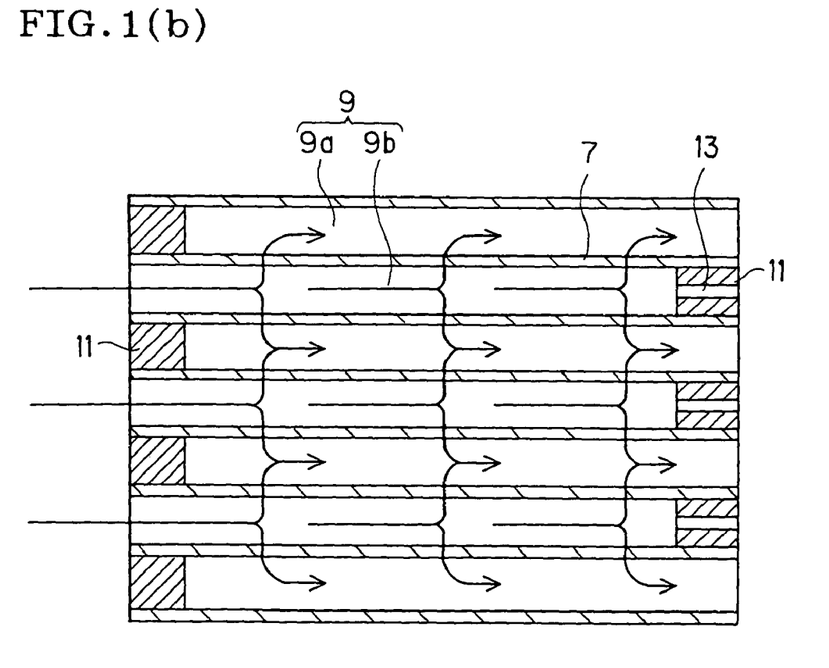

FIG. 1 shows schematic explanatory view showing one example of an embodiment of a honeycomb structure according to a first aspect of the invention, FIG. 1(*a*) is a plan view seen from one end face side, and FIG. 1(*b*) is a sectional view. A basic structure of the honeycomb structure according to the first aspect of the invention includes: a plurality of through channels 9 extending to an axial direction of a honeycomb structure, porous partition walls 7 separating through channels one another, and plugging portions 11; said plugging portion plugging predetermined through channels 9*a* at one end and the rest of through channels 9*b* at other end opposite to the plugged end of the predetermined through channels.

Moreover, as a characteristic structure of the present honeycomb structure, a through-hole 13 is formed in at least a part of the plugging portion 11, and a diameter of the through-hole 13 is 0.2 mm or more, but not more than a value which is smaller between 1 mm and 75% of a diameter of an inscribed circle of the through channel 9.

Figure 2:
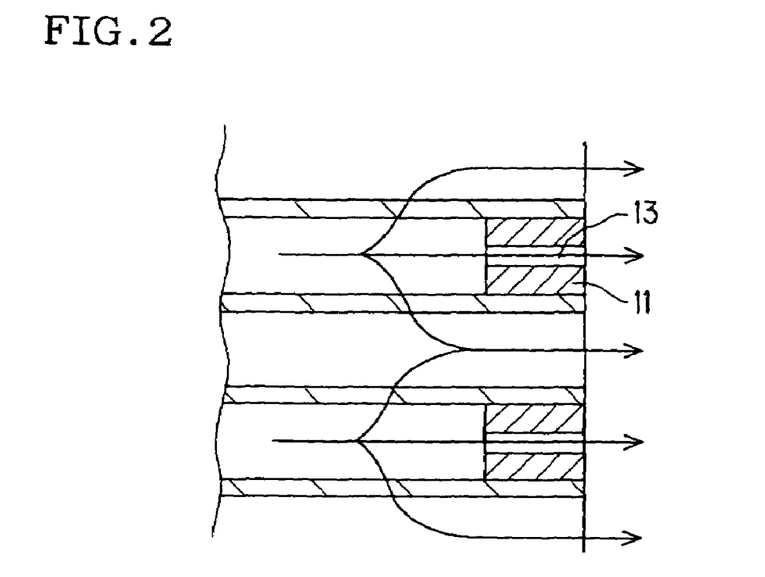
FIG. 2 is a partial sectional view showing that a through-hole of a plugging portion is opened.
Figure 3:
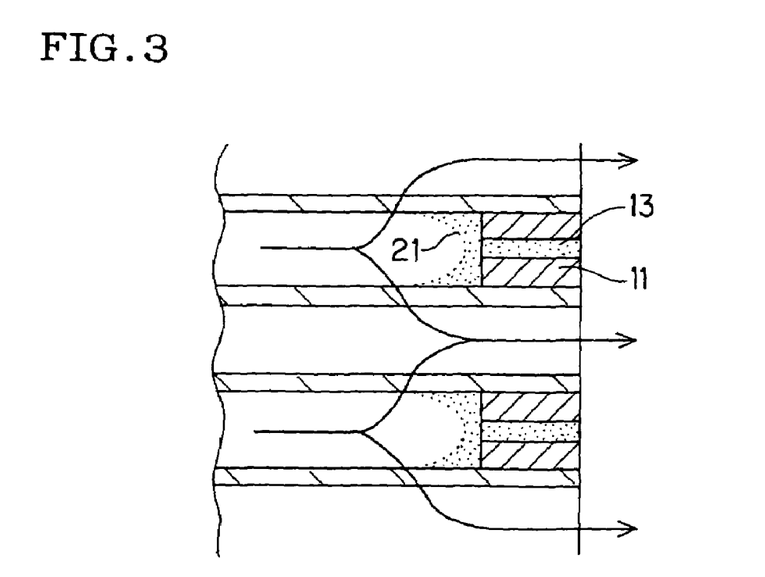
FIG. 3 is a partial sectional view showing that the through-hole of the plugging portion is filled with the particulates.

When the honeycomb structure structured in this manner is used as a filter for trapping/collecting particulates included in an exhaust gas of internal combustion engines such as a diesel engine, as shown in FIG. 2, some of the particulates in the exhaust gas pass through the through-holes 13 of the plugging portions 11 immediately after use start. Therefore, as compared with a conventional filter including no through-hole in the plugging portion, the trapping/collecting efficiency drops. However, as shown in FIG. 3, since trapped/collected particulates 21 are deposited, the through-holes 13 are substantially brought into closed states in a short time. Thereafter, the same degree of the trapping/collecting efficiency as that of the conventional filter can be attained.

Subsequently, when a given amount of trapped/collected particulates 21 are deposited in the filter, a regeneration treatment is carried out by burning/removing the captured particulates 21 with heating the filter by a heater, and the like. By this regeneration treatment, as shown in FIG. 2, the through-holes 13 plugged with the particulates 21 return again into a substantially open state.

When the through-holes 13 is reopened in this manner, residual ashes formed as a result of burning the captured particulates in the filter are discharged to the outside via the through-holes 13 with flow of the exhaust gas, and the filter returns to a clean state substantially equal to that immediately after the use start. When a series of cycle "the trapping/collecting of the particulates→the burning/removing of the particulates by the regeneration treatment→the discharging of the residual ashes" is repeated in this manner, the ashes deposited inside can be removed without requiring any special mechanism or apparatus or without temporarily detaching the filter from an exhaust system for the removal of the residual ashes, in the case of the present honeycomb structure.

In the first aspect of the invention, a lower limit of a diameter of the through-hole 13 formed in the plugging portion 11 is set to 0.2 mm. This is because with the diameter less than 0.2 mm, it is sometimes difficult to discharge the ashes even in the open state of the through-hole 13. When the diameter of the through-hole 13 is 0.4 mm or more, the ashes can substantially completely be discharged even at the time of an idling run.

Moreover, the reason why an upper limit of the diameter of the through-hole 13 is set to be a value which is smaller between 1 mm and 75% of the diameter of the inscribed circle of the through channel 9 is that the diameter larger than this upper limit, much time is required for the trapped/collected particulates 21 to close the through-hole 13, and the trapping/collecting efficiency greatly drops. When the diameter of the through-hole 13 is not more than a value which is smaller between 0.8 mm and 60% of the diameter of the inscribed circle of the through channel 9, the through-hole 13 is more easily closed, and the drop of the trapping/collecting efficiency is preferably easily inhibited.

Figure 4:
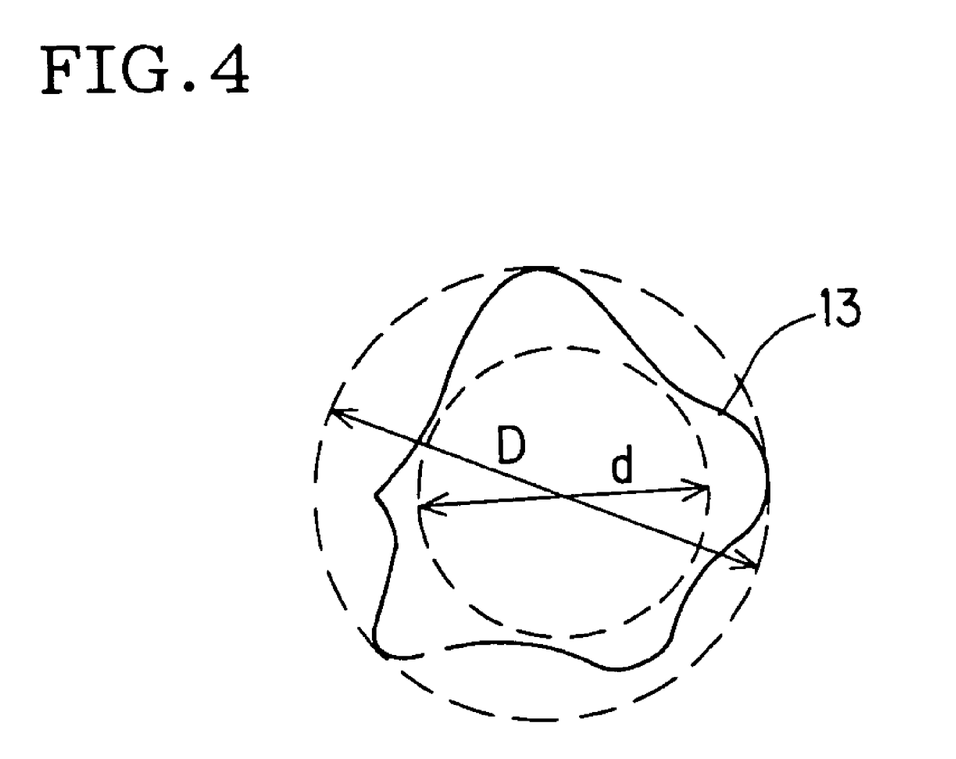
FIG. 4 is an explanatory view for defining a "diameter of the through-hole" in the present invention.

It is to be noted that in the present invention "the diameter of the through-hole" means the diameter of the through-hole in the section vertical to a passage axial direction of a portion in which the passage of the through-hole is narrowest. When the sectional shape of the through-hole 13 is other than a circular shape as show in FIG. 4, the diameter is set to a mean value between a diameter d of the inscribed circle and a diameter D of a circumscribed circle.

When the plugging portion 11 includes the through-hole 13 as described above, the trapping/collecting efficiency immediately after the use start or the regeneration treatment temporarily drops as compared with the absence of the through-hole. However, when the size of the through-hole 13 is set within the range of the present invention, the through-hole 13 is closed in a short time by the deposition of the particulates 21. Therefore, there is not any practical problem, when the average trapping/collecting efficiency in the run for a given period of time is taken into consideration, since the difference in the efficiency between the honeycomb structure having the through-hole 13 and the one having no through-hole 13 is slight.

When the honeycomb structure according to the first aspect of the invention is used in the filter for trapping/collecting the particulates included in the exhaust gas of the internal combustion engine, the filter is usually disposed in the exhaust gas system in such a manner that the center of the exhaust gas flow passes through the central portion of the section of the honeycomb structure. Therefore, as compared with a flow speed of the exhaust gas in the central portion, that of the exhaust gas flowing in the vicinity of an outer peripheral portion of the honeycomb structure is apt to be slow.

If there is the portion wherein the flow speed of the exhaust gas is slow as mentioned above, the ashes are not easily discharged in the portion as compared with the other portions. Therefore, instead of setting all the sectional areas of the through-holes of the plugging portion to be uniform, the areas may substantially be set to be nonuniform in accordance with the flow speed of the exhaust gas in each portion. For example, in the above-described example, the flow speed of the exhaust gas in the vicinity of the outer peripheral portion of the honeycomb structure decreases. Therefore, the sectional area of the through-hole of the plugging portion in the portion wherein the flow speed is slow may preferably be set to be larger than that of the through-hole of the plugging portion in a center portion seen from the side of an end face of the honeycomb structure, so that the ashes are preferably easily discharged.

Figure 5A:
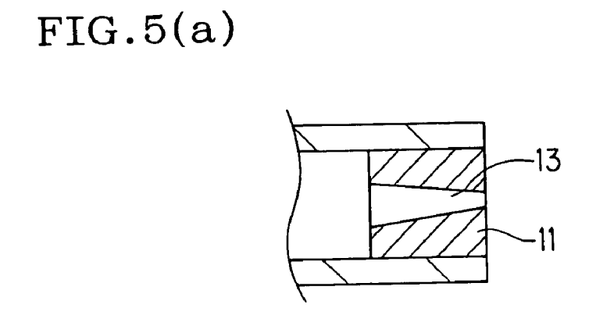
Figure 5B:
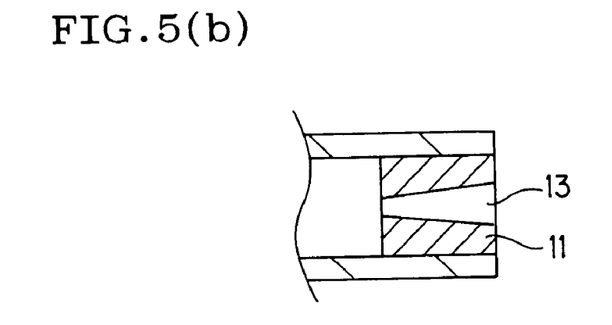
Figure 5C:
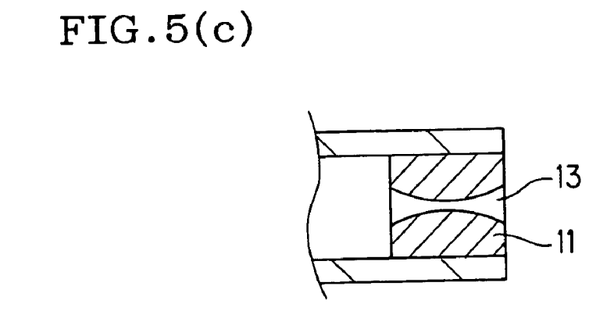

Moreover, as shown in FIGS. 5(a), 5(b) and 5(c), a sectional shape of the through-hole 13 in a through direction is set to a tapered shape or a contracted shape in which a middle portion of passage is constricted and narrowed. This can reduce a time from when the through-hole 13 opens immediately after the use start or the regeneration treatment until the through-hole 13 is closed by the trapped/collected particulates. There is also an effect of preventing occurrence of phenomenon in which with a high flow speed of the exhaust gas, the particulates filled in the through-hole 13 come off the through-hole 13 by pressure of the exhaust gas.

An oxidation catalyst is preferably carried on at least the plugging portion in which the through-hole is formed, or the plugging portion in which the through-hole is formed and the vicinity thereof. By a catalytic function of the oxidation catalyst, the particulates deposited in a catalyst carrying portion can burn at temperature (e.g., about 350° C.) lower than a usual burning temperature (about 550° C.). Therefore, the ashes can more easily be discharged. Examples of a preferable oxidation catalyst include Pt, Pd, Rh.

A sectional shape (cell shape) of the through channel is not especially limited, but from a viewpoint of manufacturing, any shape of a triangular shape, quadrangular shape, hexagonal shape, and circular shape is preferable. The sectional shape of the honeycomb structure is not especially limited. In addition to the circular shape, any shape can be used such as an elliptic shape, oblong shape, oval shape, substantially triangular shape, substantially quadrangular shape, and another polygonal shape.

For a material of the honeycomb structure, from a viewpoint of strength or heat resistance, any one having as a major crystal phase selected from the group consisting of cordierite, silicon carbide, silicon nitride, alumina, mullite, and lithium aluminum silicate (LAS) is preferably used. It is preferable to form the plugging portion from the same material as that of the honeycomb structure because coefficients of thermal expansion of them coincide each other.

Application of the honeycomb structure according to the first aspect of the invention is not especially limited. As described above, however, the partition walls for separating the through channels have a filtering capacity, and it is most preferable to use the structure as a filter for trapping/collecting/removing the particulates (particulate materials) included in dust-containing fluids such as the exhaust gas of the internal combustion engine, thereby the characteristics of the structure are fully utilized.

Next, a method for manufacturing the honeycomb structure according to the present invention will be described noting the formation of the through-holes of the plugging portions which are characteristic portions of the honeycomb structure.

In a manufacturing method according to the second aspect of the invention, firstly a ceramic paste for forming the plugging portion is injected at the end of the through channel, and then either the ceramic paste thus injected or a plugging portion formed from the ceramic paste thus injected is subjected to a processing to form a through-hole in the plugging portion. One may employ any method to form a through-hole in the plugged portion as far as the through-hole can be made in an intended shape. For example, a fluid is sprayed onto a part of the ceramic paste thus injected to form the through-hole in the plugging portion. As the fluid to be sprayed onto the ceramic paste, any of compressed air, steam, and water is preferably used.

In a manufacturing method according to other embodiment of the second aspect of the invention, when or after injecting the ceramic paste forming the plugging portion in the end of the through channel, a rod-shaped thermoplastic organic material or a rod-shaped combustible material is inserted in the ceramic paste injected. Subsequently, this is heated to allow the rod-shaped thermoplastic organic material to melt/flow out, or to allow the rod-shaped combustible material to burn/vanish, so that the through-hole is formed in the plugging portion.

That is, in the present embodiment, a hole remaining after the rod-shaped thermoplastic organic material melts/flows out, or a hole remaining after the rod-shaped combustible material burns/vanishes is used in the through-hole of the plugging portion. In the present embodiment, for the rod-shaped thermoplastic organic material, a wax material formed of organic materials such as paraffins, or plastic resins can preferably be used. For the rod-shaped combustible material any of a wax material formed of organic materials such as paraffins, plastic resins, or wood can preferably be used. The rod-shaped material to be used for the insertion should have a size sufficient to form a through-hole having a diameter of 0.2 mm or more, but not more than a value which is smaller between 1 mm and 75% of a diameter of an inscribed circle of the through channel. In this embodiment, one may easily produce a honeycomb structure having a through-hole of a tapered shaped cross section or a contracted shaped cross section in which a middle portion of passage is constricted and narrowed by using a rod having the corresponding shape.

In a manufacturing method according to another embodiment of the second aspect of the invention, a drill jig including a plurality of protrusions attached to a plate-like base is pressed onto the ceramic paste to form the through-hole in the plugging portion.

In the embodiment, a portion pierced by the protrusion of the drill jig is the through-hole. A position of the plugging portion in which the through-hole is to be formed is determined. In this case, when the drill jig including the protrusion to be opposed to the position is prepared, even a plurality of through-holes can collectively be formed in one end face of the honeycomb structure by one press with the jig.

In a manufacturing method according to still another embodiment of the second aspect of the invention, a part of the ceramic paste or a part of the plugging portion after being formed from the ceramic paste is irradiated with laser to form the through-hole in the plugging portion.

In the case of the latter embodiment, the plugging portion which does not include a through-hole is once formed. Subsequently, the plugging portion is irradiated with laser to form the through-hole in the plugging portion.

In a manufacturing method according to the third aspect of the invention, in the step of forming the plugging portion in the end of the through channel, a melting point lowering component for lowering a melting point of cordierite is mixed into solvent to prepare a mixed solution, and the mixed solution is attached to the end of the honeycomb structure of cordierite. Subsequently, the honeycomb structure is calcined to increase a thickness of a portion to which the mixed solution has been attached, so that the plugging portion including the through-hole is formed.

That is, in the present embodiment, the thickened partition wall of the through channel end forms the plugging portion, and the narrowed through channel by the thickening forms the through-hole. In this method, the thickened end is densified and strengthened as compared with the other portions. Therefore, simultaneously with the formation of the through-hole, the densified and strengthened portion can be disposed in the end.

In the present embodiment, in the honeycomb structure to which the mixed solution is to be attached, an unfired dry material can be used. In this case, for the solvent of the mixed solution, a water-insoluble or water-soluble organic solvent is preferably used. Moreover, a pre-calcined calcined material is used in the honeycomb structure to which the mixed solution is to be attached. In this case, water is preferably used in the solvent of the mixed solution.

It is to be noted that in addition to the above-described methods, various manufacturing method can be considered. However, the methods described herein are preferable from viewpoints of ease of forming the through-hole in the plugging portion and economical efficiency.

An exhaust gas purification system according to the fourth aspect of the invention is constituted using the honeycomb structure according to the first aspect of the invention, and is used for a purpose of trapping/collecting/removing the particulates (particulate materials) containing carbon as a major component included in dust-containing fluids such as the exhaust gas of the internal combustion engine. This system includes: the honeycomb structure for use as the filter for trapping/collecting the particulates according to the first aspect of the invention; and heating means for burning the particulates trapped/collected by the honeycomb structure to regenerate the filtering capacity.

In this system, the through-hole of the plugging portion of the honeycomb structure has such a structure that the through-hole is substantially closed by the trapping/collecting and depositing of the particulates, that the closed through-hole substantially opens by the burning of the particulates by heating at the time of the regeneration, and that at least some of unburnt materials such as ashes deposited in the honeycomb structure are discharged from the honeycomb structure with flow of the dust-containing fluids, when the through-hole opens.

As the heating means of the system, it is preferable to use any one of an electric heater, a burner using a gas or liquid fuel, a microwave generation apparatus, and heating means for discharging unburnt fuel components in the exhaust gas of the internal combustion engine and for burning the unburnt fuel components by a catalytic reaction to raise an exhaust gas temperature.

EXAMPLES

The present invention will be described hereinafter in more detail based on examples, but the present invention is not limited to these examples.

[Change of Pressure Loss by Run Time]

A honeycomb structure having a diameter of 144 mm, a length of 152 mm, a partition wall thickness of 0.3 mm, a cell density of 46/cm$^2$, and a diameter of the inscribed circle of the through channel of 1.17 mm was used to prepare a diesel particulate filter (DPF) including a conventional structure in which one end of the through channel was plugged by the plugging portion as shown in FIG. 6(a) or (b).

This DPF was mounted in an exhaust system of an in-line four-cylinder common rail type direct-injection diesel engine having a displacement of 2000 cc, and the trapping/collecting of the particulates and the regenerating were repeatedly carried out. It is to be noted that in the regeneration of the DPF, the fuel injected into an engine combustion chamber by post injection was burnt by a honeycomb type oxide catalyst disposed in a DPF upstream, and the particulates deposited in the DPF were burned by the generated heat.

Figure 7:
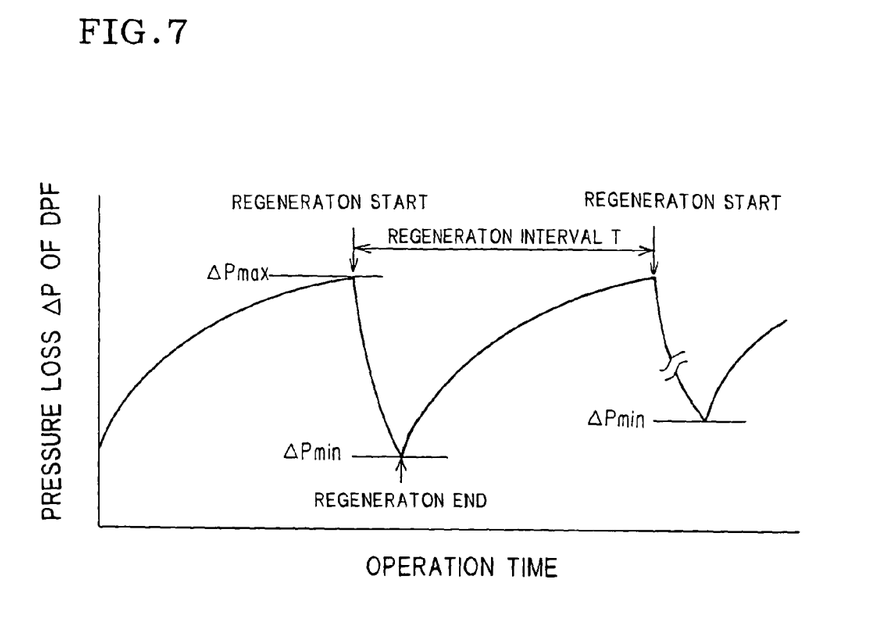
FIG. 7 is a graph showing changes of pressure loss of DPF by a run time in a case in which particulates are repeatedly trapped/collected to regenerate the filter.

FIG. 7 shows changes of the pressure loss of DPF by a run time in a case in which the particulates are repeatedly trapped/collected to regenerate the filter. First, with an elapse of run time (with the trapping/collecting of the particulates), the pressure loss of the DPF rises. When the loss reaches preset $\Delta P_{max}$, the regeneration of the DPF is started. After a given time, the regeneration is ended. At this time, the pressure loss drops to $\Delta P_{min}$. Thereafter, the trapping/collecting of the particulates are started again.

When the steps of the trapping/collecting and the regenerating are repeated, and when the DPF is always completely regenerated at the time of the regeneration, $\Delta P_{min}$ does not change. However, in the DPF including the conventional structure, $\Delta P_{min}$ gradually rises by the deposition of unburnt components by the use over a long period. By the increase of $\Delta P_{min}$, a period between the regeneration and the next regeneration (regeneration interval=T) gradually shortens, and there occurs a necessity of frequently regenerating the filter. As a result, deterioration of a regeneration system is accelerated, usability such as a restriction on a run condition at the time of the regeneration is deteriorated, or defects such as deterioration of fuel consumption involved in the regeneration are generated. Moreover, in the run with a fixed regeneration interval, both the $\Delta P_{min}$ and $\Delta P_{max}$ rise, and therefore engine capability is deteriorated.

[Presence/Absence of Through-Hole and Trapping/Collecting Efficiency]

The honeycomb structure having the diameter of 144 mm, length of 152 mm, partition wall thickness of 0.3 mm, cell density of 46/cm$^2$, and diameter of the inscribed circle of the through channel of 1.17 mm was used to prepare a DPF (the through-holes are not formed in the plugging portions) including the conventional structure in which one end of the through channel was plugged by the plugging portion as shown in FIGS. 6(a) and (b). Moreover, a DPF according to the present invention was prepared in which the through-holes were formed in the plugging portions as shown in FIGS. 1(a) and (b).

These two DPFs were mounted in the exhaust system of the common rail type direct-injection diesel engine in the same manner as described above, the particulates were trapped/collected, and changes of the trapping/collecting efficiency with the elapse of the run time were checked. It is to be noted that for the trapping/collecting efficiency, a part of the exhaust gas was sucked and passed through filter paper in the upstream and downstream of DPF, and a mass of soot in the exhaust gas, attached onto the filter paper, was measured and obtained by the following equation.

Trapping/collecting efficiency (%)={1−(soot mass in DPF downstream)/(soot mass in DPF upstream)}×100     [Equation 1]

Figure 8:
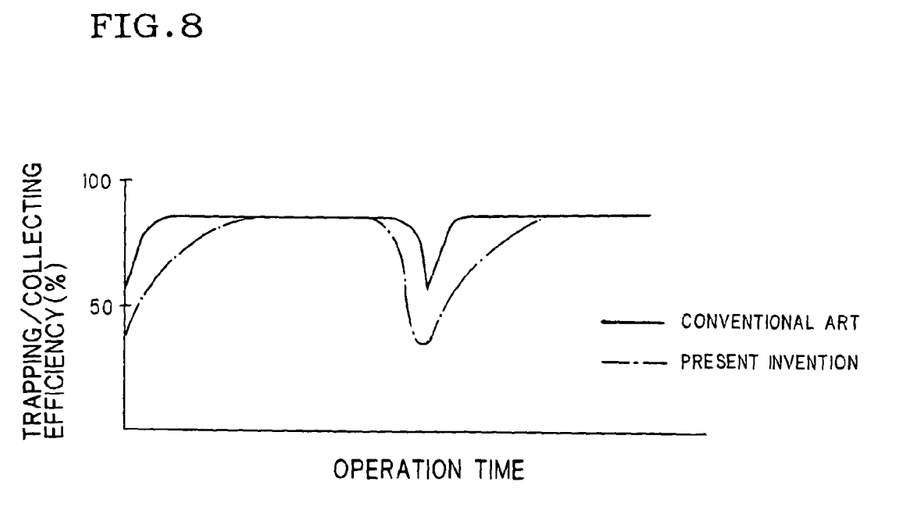
FIG. 8 is a graph showing changes of a trapping/collecting efficiency with an elapse of the run time.

Results are shown in FIG. 8. Even in the DPF including the conventional structure in which the through-holes are not formed in the plugging portions, the trapping/collecting efficiency immediately after the particulates start to be trapped/collected is low. The trapping/collecting efficiency tends to rise with the increase of the trapped/collected amount with the elapse of time. On the other hand, in the DPF according to the present invention in which the through-holes are formed in the plugging portions, the exhaust gas flows out of the through-holes of the plugging portions as such. Therefore, the trapping/collecting efficiency immediately after the trapping/collecting starts is lower than that of the DPF including the conventional structure. However, when the through-holes are closed by the deposited particulates, the trapping/collecting efficiency accordingly moderately rises. When the through-holes are completely closed, the trapping/collecting efficiency equal to that of the conventional DPF is indicated.

[Size of Through-Hole and Trapping/Collecting Efficiency]

The honeycomb structure having the diameter of 144 mm, length of 152 mm, partition wall thickness of 0.43 mm, cell density of 16/cm$^2$, and diameter of the inscribed circle of the through channel of 2.07 mm was used to prepare DPFs in which the through-holes having various diameters of 0 mm (the through-hole is not formed) to 1.2 mm were formed in the plugging portions.

Moreover, the honeycomb structure having the diameter of 144 mm, length of 152 mm, partition wall thickness of 0.3 mm, cell density of 46/cm$_2$, and diameter of the inscribed circle of the through channel of 1.17 mm was used to prepare DPFs in which the through-holes having various diameters of 0 mm (the through-hole is not formed) to 1.0 mm were formed in the plugging portions.

The former and latter DPFs were mounted in the exhaust system of the common rail type direct-injection diesel engine in the same manner as described above, the particulates were trapped/collected, and a relation of the size of the through-hole and the trapping/collecting efficiency in a given run time was checked.

Figure 9:
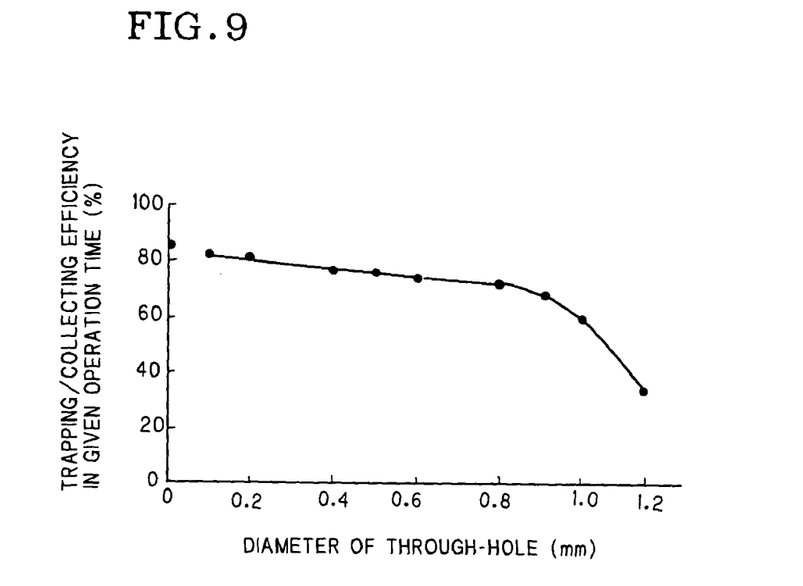
FIG. 9 is a graph showing a relation between a size of the through-hole formed in the plugging portion and the trapping/collecting efficiency in a given run time.
Figure 10:
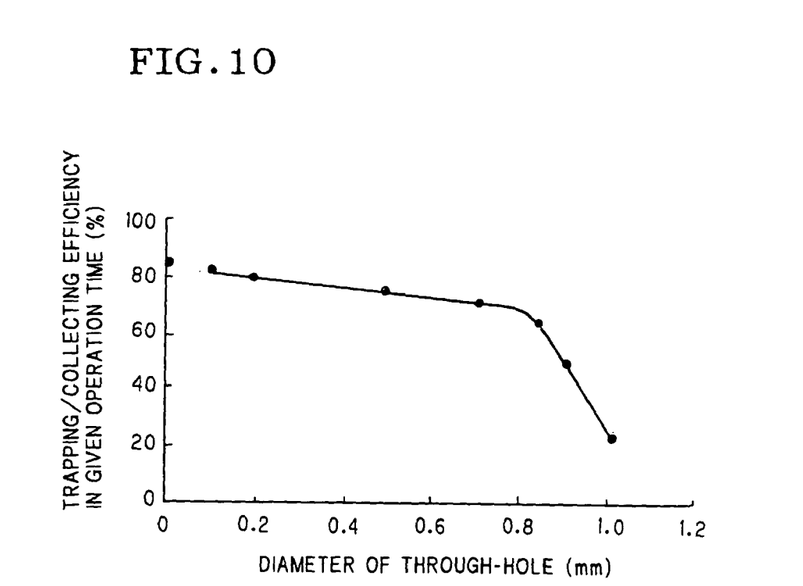
FIG. 10 is a graph showing a relation between a size of the through-hole formed in the plugging portion and the trapping/collecting efficiency in the given run time.

Results are shown in FIG. 9 with respect to the former DPF, and in FIG. 10 with respect to the latter DPF. With the increase of the diameter of the through-hole, the trapping/collecting efficiency gradually drops. However, even with the diameter of 0.8 mm, a practically sufficient trapping/collecting efficiency of 72% is indicated (it is to be noted that when the through-hole is not formed (diameter of 0 mm), the efficiency is 85%). When the diameter of the through-hole exceeds 0.8 mm, the trapping/collecting efficiency starts largely dropping. However, for example, in FIG. 9, even with the diameter of 1 mm, the efficiency is 60%, and this is a practically usable region.

With the diameter of the through-hole exceeding 1 mm, much time is required until the through-hole is closed by the deposited particulates, the trapping/collecting efficiency largely drops, and therefore this is not practical. Moreover, when the diameter of the through-hole is 1 mm or less, but exceeds 75% of the diameter of the inscribed circle of the through channel (diameter of 0.877 mm in the example of FIG. 10), the particulates are not easily deposited in a through-hole portion. Therefore, the trapping/collecting efficiency remarkably drops, and the structure cannot be used as the DPF.

Moreover, when the diameter of the through-hole is 60% or less of the diameter of the inscribed circle of the through channel (diameter of 0.702 mm in the example of FIG. 10), the particulates are more preferably easily deposited. Furthermore, when the diameter of the through-hole is less than 0.2 mm, the ashes are not sometimes discharged well. Therefore, the diameter is preferably 0.2 mm or more. However, when the diameter of the through-hole is less than 0.4 mm, the ashes are sometimes incompletely discharged in a low-speed run at 1000 rpm or less. On the other hand, when the diameter of the through-hole is 0.4 mm or more, the ashes are substantially completely discharged even at the time of the idling run, and therefore the diameter is more preferable.

From above, it can be said that the diameter of the through-hole formed in the plugging portion is preferably in a range of 0.2 mm or more, but not more than a value which is smaller between 1 mm and 75% of the diameter of the inscribed circle of the through channel, more preferable in a range of 0.4 mm or more, but is not more than a value which is smaller between 0.8 mm and 60% of the diameter of the inscribed circle of the through channel.

[Change of Pressure Loss in Use over Long Time]

The honeycomb structure having the diameter of 144 mm, length of 152 mm, partition wall thickness of 0.38 mm, cell density of 23/cm$^2$, and diameter of the inscribed circle of the through channel of 1.705 mm was used to prepare a DPF (the through-holes are not formed in the plugging portions) including the conventional structure in which one end of the through channel was plugged by the plugging portion as shown in FIGS. 6(a) and (b). Moreover, a DPF according to the present invention was prepared in which the through-holes were formed in the plugging portions as shown in FIGS. 1(a) and (b) (four types having diameters of through-holes of 0.2 mm, 0.4 mm, 0.8 mm, 1.0 mm).

These two DPFs were mounted in the exhaust system of the common rail type direct-injection diesel engine in the same manner as described above, the trapping/collecting of the particulates and the regenerating were repeatedly carried out, and changes of the pressure loss in the use for a long time were checked. It is to be noted that in the trapping/collecting and the regenerating, after trapping/collecting 7.5 g of particulates, the regeneration is carried out. This was regarded as one cycle, and this was carried out for 500 cycles.

For the DPF including the conventional structure in which the through-holes were not formed in the plugging portions, the pressure loss gradually rose. After 500 cycles, the pressure loss of 1.3 times that at the time of test start was indicated. After test end, the deposition of ashes which were unburnt components in the particulates was recognized in the DPF. On the other hand, for the DPF according to the present invention in which the through-holes were formed in the plugging portions, with any of the diameters of the through-holes of 0.2 mm, 0.4 mm, 0.8 mm, and 1.0 mm, after 500 cycles, the same pressure loss and trapping/collecting efficiency as those at the time of the test start were obtained. After the test end, the unburnt components in the particulates were not deposited in the DPF.

[Manufacturing Method]

When manufacturing the honeycomb structure according to the present invention, in the step of forming the through-holes in the plugging portions, satisfactory results were obtained with the use of any embodiment of the manufacturing methods according to the second aspect of the present invention. Particularly, the embodiment of the manufacturing method wherein the removable rod type insertion is used was found to be easiest.

As described above, with the use of a honeycomb structure of the present invention as a filter for trapping/collecting particulates included in an exhaust gas of internal combustion engines such as a diesel engine, different from a related art, it is possible to remove ashes deposited inside without requiring any special mechanism or apparatus or without detaching the filter from the exhaust system. According to a manufacturing method of the present invention, the above-described honeycomb structure can easily and economically be prepared. Furthermore, in an exhaust gas purification system of the present invention, with the use of the honeycomb structure as the filter, it is possible to easily remove the ashes deposited in the filter.

What is claimed is:

1. A honeycomb structure comprising:
    a plurality of through channels extending in an axial direction of the honeycomb structure,
    porous partition walls separating through channels one another, and
    plugging portions; said plugging portion plugging predetermined through channels at one end and the rest of through channels at other end opposite to the plugged end of the predetermined through channels,
    wherein a through-hole is formed in at least a part of the plugging portion, and a diameter of the through-hole is 0.2 mm or more, but not more than a value which is the lesser of 1 mm and 75% of a diameter of an inscribed circle of the through channel, and wherein a sectional area of the through-hole of the plugging portion in the vicinity of an outer peripheral portion of the honeycomb structure is larger than that of the through-hole of the plugging portion in a central portion of the honeycomb structure.

2. The honeycomb structure according to claim 1, wherein a diameter of the through-hole is 0.4 mm or more, but not more than a value which is the lesser of 0.8 mm and 60% of the diameter of the inscribed circle of the through channel.

3. The honeycomb structure according to claim 1, wherein each sectional area of a through-hole formed in a plugging portion of the honeycomb structure is substantially nonuniform each other.

4. The honeycomb structure according to claim 1, wherein a sectional shape of the through-hole in a through direction of the through-hole is a tapered shape or a contracted shape.

5. The honeycomb structure according to claim 1, wherein an oxidation catalyst is carried on at least the plugging portion in which the through-hole is formed, or in the plugging portion in which the through-hole is formed and the vicinity thereof.

6. The honeycomb structure according to claim 1 is used as a filter for trapping/collecting/removing particulate materials included in dust-containing fluids of an internal combustion engine by virtue of filterability of the partition walls.

7. The honeycomb structure according to claim 1, wherein a sectional shape of the through channel comprises a triangular shape, a quadrangular shape, a hexagonal shape, or a circular shape.

8. The honeycomb structure according to claim 1, wherein the honeycomb structure is made of a material comprising cordierite, silicon carbide, silicon nitride, alumina, mullite, or LAS as a major crystal phase.

9. A method for manufacturing a honeycomb structure comprising a plurality of through channels extending in an axial direction of the honeycomb structure, porous partition walls separating through channels one another, and plugging portions; said plugging portion plugging predetermined through channels at one end and the rest of through channels at other end opposite to the plugged end of the predetermined through channels, wherein a through-hole is formed in at least a part of the plugging portion, and a diameter of the through-hole is 0.2 mm or more, but not more than a value which is smaller between 1 mm and 75% of a diameter of an inscribed circle of the through channel; said method comprising the steps of:

injecting a ceramic paste forming a plugging portion into predetermined through channels from one of their end faces; and subsequently subjecting either the ceramic paste thus injected or a plugging portion formed from the ceramic paste thus injected to a processing to form a through-hole in the plugging portion, wherein the processing to form a through-hole in the plugging portion is to spray a fluid onto the ceramic paste injected.

10. The method according to claim 9, wherein the fluid to be sprayed to the ceramic paste comprises compressed air, steam or water.

11. The method according to claim 9, wherein the processing to form a through-hole in the plugging portion is to insert a rod-shaped thermoplastic organic material or a rod-shaped combustible material in ceramic paste, when or after injecting the ceramic paste forming the plugging portion in the end of the through channel; and subsequently heat the resultant honeycomb structure to allow the rod-shaped thermoplastic organic material to melt to flow out therefrom, or to allow the rod-shaped combustible material to burn to be removed therefrom, so that a through-hole is formed in the plugging portion.

12. The method according to claim 11, wherein the rod-shaped thermoplastic organic material is a wax material comprising paraffins, or a plastic resin.

13. The method according to claim 11, wherein the rod-shaped combustible material comprises paraffins, a plastic resin, or wood.

14. The method according to claim 9, wherein the processing to form a through-hole in the plugging portion is to press a drill jig including a plurality of protrusions attached to a plate-like base onto the ceramic paste injected to form a through-hole in the plugging portion.

15. The method according to claim 9, wherein the processing to form a through-hole in the plugging portion is to irradiate a part of the ceramic paste injected with laser to form a through-hole in the plugging portion.

16. The method for according to claim 15, wherein the through-hole is formed after having formed the plugging portion from a ceramic paste injected.

17. A method for manufacturing a honeycomb structure comprising a plurality of through channels extending to an axial direction of a honeycomb structure, porous partition walls separating through channels one another, and plugging portions; said plugging portion plugging predetermined through channels at one end and the rest of through channels at other end opposite to the plugged end of the predetermined through channels, wherein a through-hole is formed in at least a part of the plugging portion, and a diameter of the through-hole is 0.2 mm or more, but not more than a value which is smaller between 1 mm and 75% of a diameter of an inscribed circle of the through channel; said method comprising the steps of:

mixing a melting point lowering component for lowering a melting point of cordierite into solvent to prepare a mixed solution;

attaching the mixed solution to the end of the honeycomb structure of cordierite; and subsequently calcining the honeycomb structure to increase a thickness of a portion to which the mixed solution has been attached, so that the plugging portion including a through-hole is formed.

18. The method according to claim 17, further comprising:

forming the plugging portion including the through-hole; and disposing a reinforced portion densified as compared with a portion other than the end in the end.

19. The method according to claim 17, wherein the honeycomb structure to which the mixed solution is to be attached comprises an unfired dry material, and the solvent of the mixed solution comprises a water-insoluble or water-soluble organic solvent.

20. The method according to claim 17, wherein the honeycomb structure to which the mixed solution is to be attached is a pre-calcined calcined material, and the solvent of the mixed solution is water.

21. An exhaust gas purification system for trapping/collecting/removing particulate materials containing carbon as a major component included in dust-containing fluids of an internal combustion engine, the system comprising:

a honeycomb structure comprising a plurality of through channels extending to an axial direction of the honeycomb structure, porous partition walls separating through channels one another, and plugging portions; said plugging portion plugging predetermined through channels at one end and the rest of through channels at other end opposite to the plugged end of the predetermined through channels, wherein a through-hole is formed in at least a part of the plugging portion, and a diameter of the through-hole is 0.2 mm or more, but not more than a value which is smaller between 1 mm and 75% of a diameter of an inscribed circle of the through channel, which is used as a filter for trapping/collecting the particulate materials; and heating means for burning the particulate materials trapped/collected by the honeycomb structure to regenerate a filtering capacity, wherein a through-hole in a plugging portion of the honeycomb structure is such a structure that the honeycomb structure is closed by the trapping/collecting and depositing of the particulate materials, that the closed through-hole opens by the burning of the particulate materials by heating at the time of the regeneration, and that at least some of unburnt materials such as ashes deposited in the honeycomb structure are discharged from the honeycomb structure with flow of the dust-containing fluids, when the through-hole opens, and wherein a sectional area of the through-hole of the plugging portion in the vicinity of an outer peripheral portion of the honeycomb structure is larger than that of the through-hole of the plugging portion in a central portion of the honeycomb structure.

22. The exhaust gas purification system according to claim 21, wherein the heating means is any one of an electric heater, a burner using a gas or liquid fuel, a microwave generation apparatus, and heating means for discharging unburnt fuel components in the exhaust gas of the internal combustion engine and for burning the unburnt fuel components by a catalytic reaction to raise an exhaust gas temperature.

* * * * *